United States Patent [19]

Verity

[11] 4,167,807
[45] Sep. 18, 1979

[54] IMPROVEMENT IN MAKING ELECTROCHEMICAL CELLS EMPLOYING AN ALKALI METAL AND A SOLID ELECTROLYTE

[75] Inventor: Christopher Verity, Long Eaton, England

[73] Assignee: Chloride Silent Power Limited, London, England

[21] Appl. No.: 906,184

[22] Filed: May 15, 1978

[30] Foreign Application Priority Data

May 18, 1977 [GB] United Kingdom ............... 20986/77

[51] Int. Cl.² .......................................... H01M 10/38
[52] U.S. Cl. .................................... 29/623.1; 429/52; 429/104
[58] Field of Search ............................. 29/623.1, 623.2; 429/104, 102, 103, 101, 52

[56] References Cited

U.S. PATENT DOCUMENTS

| 3,833,422 | 9/1974 | Will et al. | 429/104 |
| 3,953,227 | 4/1976 | Jones et al. | 429/193 |
| 3,982,957 | 9/1976 | Jones et al. | 429/185 |
| 4,006,281 | 2/1977 | Markin et al. | 429/104 |
| 4,104,448 | 8/1978 | Gibson et al. | 29/623.2 |

Primary Examiner—Francis S. Husar
Assistant Examiner—Daniel C. Crane
Attorney, Agent, or Firm—Beveridge, DeGrandi, Kline & Lunsford

[57] ABSTRACT

In the manufacture of a sodium sulphur cell, the sodium is gas-pressurized to force it upwardly over a surface of the electrolyte by means of a capsule of material, e.g. sodium azide, which releases an inert gas on heating, so enabling the cell to be sealed before the sodium is pressurized.

15 Claims, 2 Drawing Figures

IMPROVEMENT IN MAKING ELECTROCHEMICAL CELLS EMPLOYING AN ALKALI METAL AND A SOLID ELECTROLYTE

BACKGROUND OF THE INVENTION

1. Field of the Invention

This invention relates to electrochemical cells employing an alkali metal and a solid electrolyte.

2. Prior Art

A typical example of such a cell is a sodium sulphur cell. In such a cell liquid sodium constitutes the anode and is separated by a solid electrolyte, usually a beta alumina ceramic material, from a cathodic reactant comprising liquid sulphur and sodium polysulphides. In order to maintain a high rate of charge and discharge, the anode surface of the electrolyte has to be kept covered with liquid sodium. Sodium passes through the electrolyte on discharge of the cell and it is known therefore to provide capillary or other wicking means to maintain the electrolyte surface wetted with sodium which is drawn from a reservoir. It is also known to make use of gas pressure in a sodium reservoir to force the liquid sodium into the region adjacent the electrolyte surface (see for example U.S. Pat. No. 3,953,227). Such a gas pressurised cell requires the filling of the sodium compartment in such a manner that the gas pressure is sufficient even when the sodium in the anodic region is depleted on discharge of the cell, to force liquid sodium upwardly over the electrolyte surface. This raises considerable problems in the manufacture of such cells. In the specification of British Patent Application No. 41680/75 (U.S. Application Ser. No. 730,711, now U.S. Pat. No. 4,104,448) there is described and claimed an alkali metal-sulphur cell of tubular form in which the anode compartment is divided into first and second gas-tight chambers, the first chamber defining an annular space around the electrolyte tube and communicating with the second chamber to enable the passage of liquid alkali metal between the chambers, gas spaces being created above the alkali metal in the two chambers by porous masses which are not wetted by the liquid alkali metal, volumes of said spaces being such that, at the operating temperature of the cell, the gas pressure in the second chamber is higher than the gas pressure in the first chamber, whereby liquid alkali metal is forced from the second chamber into the first chamber to maintain the operative surface area of the electrolyte tube covered with liquid alkali metal during discharge of the cell. More particularly the porous masses may comprise carbon felt or alumina felt. In the manufacture of such a cell, hot liquid sodium is filled into the anode compartment, the filling operation being carried out in an inert gas atmosphere so that the porous masses become filled with the inert gas, which may for example be nitrogen or helium or argon. The porous mass has a low heat conductivity and will remain relatively cool during the filling operation. After the cell has been sealed, on heating the cell to its operating temperature which is typically 350° C., the gas in the porous material will have a much higher pressure and hence provides the required pressurisation on the liquid alkali metal to force this metal upwardly over the surface of the electrolyte. To achieve this objective the cells described in the above-mentioned specification have to have a porous gas-containing material which is not wetted by the liquid alkali metal and which serves to hold the gas in the alkali metal reservoir whilst the reservoir is being filled so as to ensure that there is gas retained within the reservoir.

SUMMARY OF THE INVENTION

It is an object of the present invention to provide an improved method of manufacture of an electrochemical cell having a gas pressurised alkali metal reservoir.

According to one aspect of the present invention, in a method of manufacturing an electrochemical cell of the kind having a solid electrolyte tube separating a cathodic reactant from a liquid alkali metal forming an anode with the alkali metal in a container containing an inert gas trapped above the alkali metal, said container being open at its lower end to an annular region extending upwardly around a surface of the electrolyte tube, said container is initially charged with alkali metal, in solid or liquid form, together with a substance which will decompose or will react with the alkali metal on heating to give an inert gas, that is to say a gas which does not react with the alkali metal, said substance furthermore being such that any other product of the decomposition or reaction is the alkali metal or a material or materials which, at or below the operating temperature of the cell, is or are chemically inert with respect to the alkali metal.

The nature of the invention will be clearer by considering more specific examples. If the liquid alkali metal is sodium, the sodium compartment of the cell may be charged with sodium in liquid or solid form together with sodium azide. The sodium azide will decompose on heating to a temperature on the order of 340° C. to give sodium and nitrogen. It is thus possible to load the sodium reservoir or sodium compartment of the cell either with solid sodium or with liquid sodium at a temperature of 110°–120° C. together with a small quantity of sodium azide. The sodium compartment of the cell can then be sealed and, when the cell is heated, sodium azide will decompose to produce nitrogen. By proper choice of the amount of sodium azide and the space left in the container on filling, the required pressure can readily be developed. The decomposition products in this case are only sodium and nitrogen gas and this is a particularly suitable material which is readily and cheaply available. As will be explained later however there are other materials which can be used, particularly nitrogen-producing organic compounds such as are used as blowing agents for making foamed plastics.

This technique for filling the container with alkali metal which, when the cell is in use, is under gas pressure, has a number of substantial advantages. It avoids any requirement for a porous matrix for holding the gas in the container. It permits filling of the cell with the alkali metal in solid form thereby facilitating handling of the alkali metal; in many cases for example a preformed element of solid alkali metal can be dropped into a container. It is still possible however to use liquid filling. It is not necessary however to heat the cell during the filling process. If the gas-producing substance decomposes at the temperature of the liquid sodium, it may be temporarily protected by a barrier of poor thermal conductivity, e.g. of carbon felt. The container can be sealed before the gas pressure is developed. The absence of gas pressure may facilitate the sealing operation; for example if a cap is welded onto the container, sodium contamination of the welding region can readily be avoided. Much more generally, this technique for gas pressurising the alkali metal permits of much greater flexibility in arranging the cell assembly; the filling and sealing of the alkali metal container may much more readily be effected at a desired stage in the operation, for example before or after assembling the cathode electrode in the cell or sealing the electrolyte in position.

For a cell in which the alkali metal is sodium, it is preferable to employ, as said source of gas, a material which does not decompose or react with the sodium at temperatures below 100° C. but will decompose or react with the sodium at a temperature not exceeding 350° C. As indicated above sodium azide is a particularly suitable material. It contains a large proportion of nitrogen per molecule and thus it is only necessary to use a very small quantity of sodium azide for pressurising a cell. Typically only 100 milligrams might be required for a cell containing over 250 cubic cms of sodium.

Another material which might be used is sodium nitride; this decomposes at about 300° C. to give nitrogen and sodium. Sodium azide however is preferable to sodium nitride in that the material is more readily available and is cheaper and more particularly it gives a much larger quantity of nitrogen for a given weight of material.

Yet another material which might be employed is ammonium nitrate. This is cheap and easily obtainable and decomposes at a temperature of about 150° C. The decomposition gives water as well as nitrogen and oxygen which leads to high pressures being produced initially until the hydrogen from the water is fixed as sodium hydride. The overall chemical reaction in this case may be expressed as follows:

$$NH_4NO_3 + 10Na \rightarrow 3Na_2O + N_2 + 4NaH$$

Yet another material which can be employed is sodium nitrite. This material is cheap and readily obtainable. The decomposition temperature in this case however is 320° C. The material decomposes to nitrogen oxides which will further react with the sodium to give nitrogen and sodium oxide. The overall reaction can be expressed as follows:

$$2NaNO_2 + 6Na \rightarrow N_2 + 4Na_2O$$

If the gas producing material decomposes on heating to produce the gas, it may be encapsulated before being put in the cell employing a capsule which will open to release the gas when the gas is produced; typically the material might be encapsulated between two discs of aluminium foil which are secured together, for example by an impact adhesive. The foil layers will tear or burst apart when the gas is released on heating.

Because of the very small quantity of gas-producing material which is required, it is convenient to form a tablet by mixing the required quantity with an inert filler. A typical filler for use with sodium azide is sodium chloride; the ratio of NaCl to NaN$_3$ may typically be 10 to 1 by weight. Tablets can be readily made using pharmaceutical tabletting techniques with adequate accuracy in the weight of azide. Sodium chloride/sodium azide tablets are readily made sufficiently strong for handling without encapsulation although precautions must be taken to minimise moisture pick-up as sodium azide is hygroscopic. The tablets may for example be stored in a dessicator prior to use or packed in a pharmaceutical tablet bubble packing using vinyl coated aluminium foil. There are many inert fillers suitable for use in a sodium sulphur cell, e.g. alumina, magnesium oxide or carbon. The main requirements for the filler are that it has good compacting properties and that it does not decompose to gaseous products at the operating temperature of the cell.

As is well known in cells employing gas pressurising to force the liquid alkali metal over the surface of the electrolyte, the gas has to be trapped in a region above the alkali metal so that the pressure exerted on the alkali metal forces that metal upwardly against gravity over the surface of the electrolyte. Conveniently the cell is a tubular cell used in an upright position with the alkali metal reservoir below the electrolyte tube and with the gas trapped in a cap below the electrolyte tube, this cap being arranged so that the alkali metal, by the gas pressure, is forced downwardly to pass under the bottom edge of the cap and then upwardly through an annular region around the outside of the cap and thence upwardly into an annular region over the electrolyte surface. This annular region is most conveniently around the outside of the electrolyte surface. In this construction the cathode electrode of the cell can be inside the electrolyte tube. It is alternatively possible, for a tubular cell, to use an annular cap in which the gas is trapped, the gas pressure forcing the alkali metal downwardly through an outer annular region so that it can then pass upwardly through an inner annular region around the electrolyte tube.

Although the present invention has very particular application to cells in which a pressurised gas is used to force the liquid alkali metal upwardly over the surface of the electrolyte in an upright cell, this technique may be used also for horizontal cells. If the cell incorporates a wick or other capillary means to keep the electrolyte surface covered with sodium, the cell could be filled, as described above, in the vertical position so that, on heating, the sodium is forced by gas pressure to fill the wick or other capillary means: the cell can then be operated horizontally. Preferably however, for a cell to be operated horizontally, a cap as described above may be located in the cell so that the sodium outlet is well below the level of the trapped gas. The cap may be in the form of a can which may be correctly located by a longitudinal groove or by suitable shaping of the can. The terminal locations on the cell may be arranged to ensure the correct orientation of the cell and pressure can. With such a pressure can, a cell, with or without a wick, may be heated to pressure the sodium and then charge/discharge cycled in the horizontal position. If the cell incorporates a wick or other capillary means, it may be rotated after the initial heating to fill the wick. An advantage of the use of the gas pressurising for a cell with a wick or capillary is that the assembly is easier in that no liquid filling with sodium is needed.

The invention also includes within its scope a cell made by the above-described method.

DESCRIPTION OF THE PREFERRED EMBODIMENTS

Figure 1:
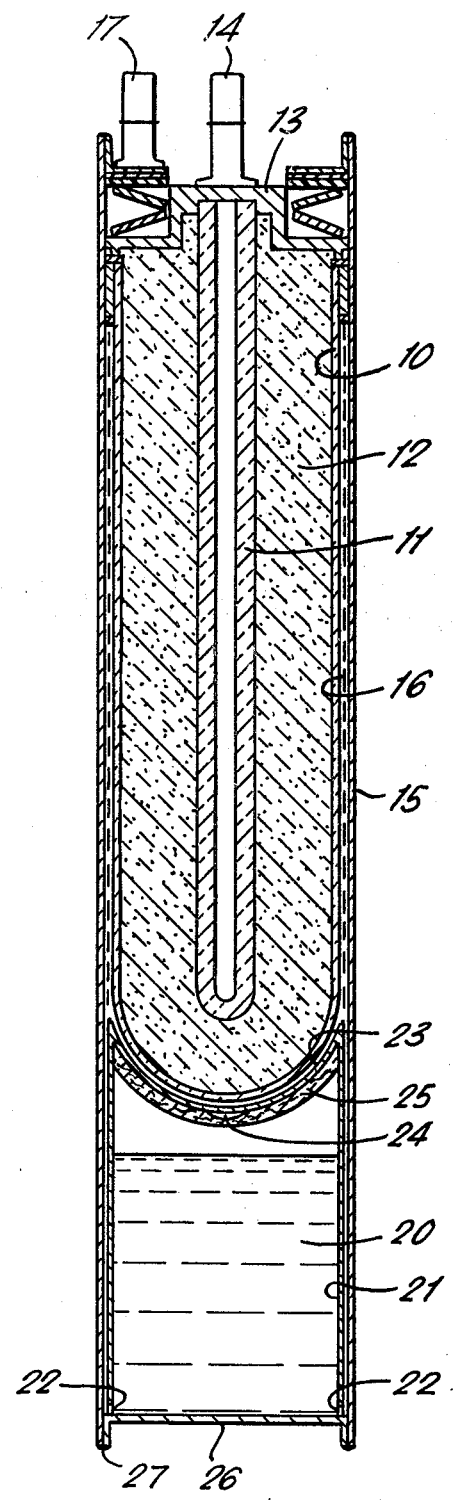
FIG. 1 illustrates diagrammatically a sodium sulphur cell forming one embodiment of the invention.

Referring to FIG. 1, there is illustrated a tubular cell having a solid ceramic electrolyte tube 10 of beta alumina within which is an axially extending carbon current collector rod or tube 11; the annular region 12 between the electrolyte tube and the current collector contains the cathodic reactant comprising sulphur and polysulphide in a matrix material, typically of carbon or graphite felt. The cathodic compartment is sealed at its upper end by a closure 13 carrying a cathode terminal 14. The housing of the cell comprises a mild steel tubular housing 15 which closely surrounds the electrolyte tube 10 leaving a capillary region which may contain a wick or sheath 16 or other capillary device to assist in keeping the external surface of the electrolyte tube 10 wetted with sodium. An anode terminal 17 is electrically connected to the housing 15.

The sodium 20 is contained initially within a reservoir formed by an aluminium pressure can 21 open at its lower end and located within the steel housing 15. This can 21 may be spaced slightly from the inner surface of the housing or may have grooves in its surface to permit flow of the sodium around the bottom edge 22 of the can and thence upwardly into the aforementioned capillary region. The pressure can has a concave domed top 23 shaped to fit over the lower closed end of the electrolyte tube 10. A graphite foil disc, not shown, may be provided between the domed end 23 of the can and the end of the electrolyte tube to protect the end of the tube.

The gas producing material, e.g. the sodium azide, is conveniently encapsulated between two sheets of aluminium foil. In filling the cell with sodium, the cell is inverted and the capsule 24 of the gas producing material is put into the pressure can so that it lies on the domed end 23. The thin layer 25 of carbon felt or aluminum oxide fibre is preferably then put in the can although this is not essential. The can, whilst still inverted, is then filled with sodium, the operation being carried out in a nitrogen atmosphere. This filling of the can may be effected before the can is put in the cell. With the can in the cell, the end of the cell is then sealed by a cap 26 welded to the outer housing at 27. It will be noted that there is a small gap between the lower open end 22 of the can and this cap 26 when the cell is assembled. The remaining assembly of the cell can now be effected. Some of this assembly may have been carried out before or it may be done at this stage. Preferably the seal assembly 13 at the upper end of the cell and the sulphur electrode 12 have previously been assembled and completed before the pressure can 21 is put in the cell and the lower end cap 26 welded in position. The can 21 is arranged to be a fairly tight fit in the housing 15 so that the spacing between the housing and the can forms a flow restrictor limiting the flow of sodium to the electrolyte region. A further graphite foil disc may be included over the end cap 26 of the cell.

The assembly is now complete and the cell can be warmed up to a temperature, typically about 350° C., such that the sodium azide decomposes and releases nitrogen. This pushes the sodium, which at this temperature is liquid, downwards out of the can 21 into the annular region between the housing and the can and up into the annular region around the electrolyte. The gas, when this operation is complete, occupies the region above the top of the sodium 20 in the reservoir.

The amount of sodium azide introduced and the gas space left when filling the container with sodium are made such that sufficient nitrogen pressure is developed when the sodium azide decomposes to keep the electrolyte surface wetted with sodium even when the cell is fully discharged.

Figure 2:
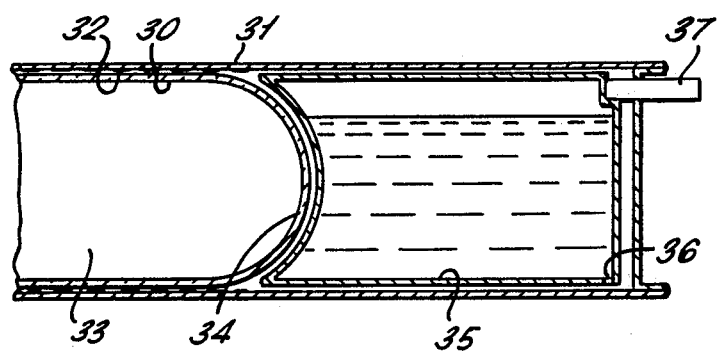
FIG. 2 is a diagram illustrating part of another construction of sodium sulphur cell showing a second embodiment of the invention.

FIG. 2 shows part of a sodium sulphur cell for operation horizontally. In this figure, there is shown part of a beta-alumina ceramic electrolyte tube 30 in an outer housing 31, the annular region 32 between the tube and housing containing sodium when the cell has been pressurised. This region, in the known way, may constitute a capillary region or it may contain a wick or other capillary means. The region 33 inside the electrolyte tube 30 is the cathodic region and, in the known way, may contain a porous electronically-conductive matrix containing the cathodic reactant and extending between the surface of the electrolyte tube and a current collector (not shown). Adjacent the closed end 34 of the electrolyte tube 30 within the housing 31 is an aluminium pressure can 35 having an outlet 36 for sodium at the bottom when the cell is correctly oriented, as shown. This can 35 forms the sodium reservoir and is charged before assembly with the sodium and a tablet or capsule of the gas-producing material. After assembly of the cell, heating causes gas to be produced in the pressure can 35 so forcing sodium out through the outlet hole 36 to fill the region 32 around the tube 30.

An output terminal 37 on the base of the can serves also as an indicator for correct orientation of the cell about its axis to ensure that the hole 36 is at the bottom. If the annular region 32 contains a wick, once the wick has been filled with sodium, the orientation of the cell is immaterial.

In order to pressurise the sodium reservoir at a lower temperature, the sodium azide may be mixed with other salts. As previously mentioned, it is convenient to form the material into a tablet using an inert filler. The following are examples of two such tablet compositions.

EXAMPLE I

| | |
|---|---|
| NaCl | 62% by weight |
| NaN$_3$ | 10% by weight |
| AgNO$_2$ | 18% by weight |
| Talc | 10% by weight |

EXAMPLE II

| | |
|---|---|
| NaCl | 78% by weight |
| NaN$_3$ | 10% by weight |
| MgSO$_4$ . 7H$_2$O | 2% by weight |
| Talc | 10% by weight |

A first cell was activated by a tablet containing 330 mg of the mixture of Example I. An open circuit voltage appeared at 146° C. and the cell resistance was 18 m ohm (2.25 ohms per sq cm). A second cell was activated by a tablet containing 330 mg of the mixture of Example II; an open circuit voltage appeared at 207° C. and the cell resistance was 25 m ohm (3.1 ohm per sq cm).

It is advantageous to use these mixtures in cells with compression seals as the pressurisation of the sodium reservoir occurs at a temperature lower than that at which the seals become vacuum-tight, thus allowing gas to escape from the sodium annulus and allowing complete filling with sodium.

The sodium nitrite in Example I above gives off nitrogen. The magnesium sulphate of Example II gives off water vapor which reacts with sodium to give hydrogen gas. This will eventually react with sodium to form sodium hydride but, by that time, the sodium azide will have decomposed to give nitrogen gas.

Other materials which may be used include nitrogen-producing organic compounds commercially available as "blowing agents" such as are used to manufacture foamed plastics and rubber, e.g. the Genitron range marketed by Fisons Ltd which includes compounds such as azodicarbonamide (azobisformamide) which decomposes between 200° and 230° C. A range of such materials decomposing at temperatures between 100° and 200° C. are available.

Although the cells illustrated in FIG. 1 and FIG. 2 have sodium around the electrolyte tube, the technique described may be used with cells having the sodium inside the tube.

I claim:

1. A method of manufacturing an electrochemical cell having a solid electrolyte tube separating a cathodic reactant from a liquid alkali metal forming an anode with the alkali metal in a container containing an inert gas trapped above the alkali metal, said container being open at its lower end to an annular region extending upwardly around a surface of the electrolyte tube, wherein said method comprises the step of initially charging said container with alkali metal, in solid or liquid form, together with a substance which will decompose or will react with the alkali metal on heating to give an inert gas, said substance furthermore being such that any other product of the decomposition or reaction is a material which, at or below the operating temperature of the cell, is chemically inert with respect to the alkali metal.

2. A method as claimed in claim 1 wherein said substance is a material which, on heating, produces nitrogen.

3. A method as claimed in claim 1 wherein the liquid alkali metal is sodium, wherein the sodium is in a compartment of the cell, and said compartment is charged with sodium in liquid or solid form together with sodium azide, the cell being heated to a temperature sufficient to decompose the sodium azide.

4. A method as claimed in claim 3 wherein the initial charging of said container is effected at a temperature of 110° to 120° C.

5. A method as claimed in claim 2 wherein the gas-producing substance decomposes at a temperature below the melting point of sodium and wherein said alkali metal is liquid sodium, said substance being temporarily protected by a barrier of poor thermal conductivity, and wherein the container is sealed before the gas pressure is developed.

6. A method as claimed in claim 1 and in which the alkali metal is sodium and wherein said substance, which is employed as said source of gas, is a material which does not decompose or react with the sodium at temperatures below 100° C. but will decompose or react with the sodium at a temperature not exceeding 350° C.

7. A method as claimed in claim 6 wherein said substance is sodium azide.

8. A method as claimed in claim 6 wherein said substance is sodium nitride.

9. A method as claimed in claim 6 wherein said substance is ammonium nitrate.

10. A method as claimed in claim 6 wherein said substance is sodium nitrite.

11. A method as claimed in claim 6 wherein said substance is an organic compound which decomposes on heating to produce nitrogen.

12. A method as claimed in claim 2 wherein said substance is encapsulated before being put in the cell, such that the encapsulated substance will open to release the gas when the gas is produced on heating.

13. A method as claimed in claim 12 wherein said substance is encapsulated between two discs of aluminium foil which are secured together to form a capsule in which the foil layers will tear or burst apart when the gas is released on heating.

14. A method as claimed in claim 1 wherein said gas-producing substance is mixed with an inert filler and formed into a tablet.

15. A method as claimed in claim 1 comprising heating the cell to decompose the substance or react the alkali metal and substance thereby producing said inert gas within the cell.

* * * * *